(12) United States Patent
Starner et al.

(10) Patent No.: US 7,048,370 B2
(45) Date of Patent: May 23, 2006

(54) MAGNETIC MOUNT EYEGLASSES DISPLAY SYSTEM

(75) Inventors: Thad Starner, Atlanta, GA (US); Dan Ashbrook, Atlanta, GA (US)

(73) Assignee: Charmed Technology, Inc., Santa Monica, CA (US)

( * ) Notice: Subject to any disclaimer, the term of this patent is extended or adjusted under 35 U.S.C. 154(b) by 83 days.

(21) Appl. No.: 09/915,371

(22) Filed: Jul. 27, 2001

(65) Prior Publication Data

US 2002/0089639 A1 Jul. 11, 2002

Related U.S. Application Data

(60) Provisional application No. 60/221,095, filed on Jul. 27, 2000.

(51) Int. Cl.
*G02C 9/00* (2006.01)
*G02C 1/00* (2006.01)

(52) U.S. Cl. .......................... 351/47; 351/57; 351/158

(58) Field of Classification Search .................. 351/47, 351/48, 57, 58, 44, 158, 41
See application file for complete search history.

(56) References Cited

U.S. PATENT DOCUMENTS

| | | | |
|---|---|---|---|
| 5,416,537 A * | 5/1995 | Sadler | 351/57 |
| 6,092,896 A | 7/2000 | Chao et al. | |
| 6,139,141 A | 10/2000 | Zider | |
| 6,164,774 A | 12/2000 | Cate | |
| 6,204,974 B1 | 3/2001 | Spitzer | |
| 6,231,179 B1 | 5/2001 | Lee | |

FOREIGN PATENT DOCUMENTS

JP 57-184910 * 11/1982 .................. 351/47

* cited by examiner

*Primary Examiner*—Hung Xuan Dang
(74) *Attorney, Agent, or Firm*—Beyer Weaver & Thomas, LLP

(57) ABSTRACT

Magnetic mount auxiliary lenses with optional display system enabling user ease of removal, storage and fine tuning by adding or removing magnets in complimentary positive/negatively charged polar compositions.

12 Claims, 12 Drawing Sheets

MAGNETIC MOUNT EYEGLASSES DISPLAY SYSTEM

This application claims the benefit of U.S. Provisional Application No. 60/221,095, filed Jul. 27, 2000.

BACKGROUND OF THE INVENTION

This invention relates to head-up displays or wearable eyeglasses with auxiliary electronic display systems which are detachably secured with a system of magnets. There is prior art in the field of head-up displays or wearable eyeglass display systems which are best known for their use in military aircraft. However, mobile head-up displays are just now coming to market for use with wearable computers as well as other applications. One major issue for user acceptance of wearable head-up displays is their bulk and inconvenience to don and doff. Many manufacturers sell arrangements that look like large modified headphones to mount these displays. The pressure on the head from these mounting arrangements may lead to headaches and discomfort. In addition, in an effort to create a one-size fits all device, manufacturers are creating articulated boom arms that allow the display to be positioned in various locations in front of the eye. Unfortunately, these boom mounts often move excessively when the user walks or performs other physical activities. In addition, positioning the display on a boom mount takes considerable time and effort.

Manufacturers envision the user being able to glance at the display, move it out of the user's line of sight when finished, and then return it to the line of sight when needed. Unfortunately, the amount of effort required to readjust the display places an unreasonable onus on the user. Furthermore, there are minimal if any existing incremental adjusting capabilities which may be required for sensitive optical display systems. What is needed is a small, lightweight mounting solution that allows the user to don and doff the display quickly while slipping into place with equal facility.

U.S. Pat. No. 6,092,896, issued to Chao, et al. on Jul. 25, 2000, contemplated a prefabricated, eyeglass frame with a bridge including a magnetic member and retaining mechanisms for attaching and supporting auxiliary lenses; however, unlike the solution advanced in the present invention, this method is cumbersome, requires the user to remove the glasses from their face in order to separate the auxiliary lenses and/or frame, does not have the initial ability to be adjusted by the user for incremental fine tuning and did not contemplate use in conjunction with electronic optical display systems incorporated on auxiliary lenses, thus leaving the pertinent field open for development.

U.S. Pat. No. 6,139,141, issued to Zider on Oct. 31, 2000, contemplated prefabricated, permanently affixed or imbedded magnetic mounts comprised of male and female fitted parts on a combination of one or all of the eyeglass bridge, temples and frames in an effort to minimize slippage and provide structural support which it claimed had not been successfully achieved in the past; however, unlike the solution advanced in the present invention this method is cumbersome, does not have the initial ability to be adjusted by the user for incremental fine tuning and did not contemplate use in conjunction with electronic optical display systems incorporated on auxiliary lenses, thus leaving the pertinent field open for development.

U.S. Pat. No. 6,164,774, issued to Cate on Dec. 26, 2000, also contemplated magnetically attached auxiliary lenses in combination with bridge or temple mechanical support which could be removed easily while minimizing slippage; however, unlike the solution advanced in the present invention this method is prefabricated, does not have the initial ability to be adjusted by the user for incremental fine tuning and did not contemplate use in conjunction with electronic optical display systems incorporated on auxiliary lenses, thus leaving the pertinent field open for development.

U.S. Pat. No. 6,204,974, issued to Spitzer on Mar. 20, 2001, introduced a head-mountable image display system similar to eyeglasses capable of providing an image to a user's eye separate from ambient light and although significantly more compact than relevant art in the field as discussed in the first paragraph above, maintains use of a head frame comprised of a support boom, head band, eyepiece and related input/output components which reduce the aesthetic and minimalistic accomplishments that the present invention achieves by introducing the display system incorporated upon removable auxiliary lenses, thus leaving the pertinent field open for development.

U.S. Pat. No. 6,231,179, issued to Lee on May 15, 2001, presents another means of attaching clip-on sunshades to spectacles via magnets and hinge mounting; however, unlike the solution advanced in the present invention this method is prefabricated, does not have the initial ability to be adjusted by the user for incremental fine tuning and did not contemplate use in conjunction with electronic optical display systems incorporated on auxiliary lenses, thus leaving the pertinent field open for development.

SUMMARY OF THE INVENTION

The present invention resolves the need for an attachable wearable display system which had not been contemplated in the prior relevant art in the form of auxiliary lenses housing electronic optical displays which can be attached to underlying eyeglass frames with removable magnetic mounts positioned to support the auxiliary lenses without slippage. The magnetic mounts can be arranged in a complimentary or dual pattern of positive and negative poles which, when facing off properly, essentially "lock in" or default to the optimal pitch, roll and yaw, as initially calibrated by the individual as the ideal arrangement. This mounting solution should be customizable on a person by person basis and may be adjusted in as many variations as there are lens shapes and frames. In one embodiment of the invention, if a certain angle or pitch is required by the user who may have differing vision requirements in each eye, additional magnets can be inserted to modify the positioning of the lenses. Once the user determines that the display has been adjusted appropriately to their physiognomy, if desired, glue can be used to make the complimentary magnetic arrangements on both the display and eyeglasses frame permanent. Thus, the user can adjust the display once during an initial fitting and will not need to again during everyday use. This advantage significantly reduces the perceived inconvenience of using a heads-up display. Furthermore, the "lock-in" effect achieved by the alternate or sequential arrangement of magnets to face off against magnets with opposite poles removes the need for heavier, more complicated clip-on designs that may not work with every user's eyeglasses.

In addition to the adjusting capabilities of these paired magnetic mounts, the magnets will also serve to activate and deactivate the on/off magnetic switch in the battery-cell-powered display devices which can be mounted on the auxiliary lenses with optional components imbedded within the frames of the underlying eyeglasses. When the user don's the auxiliary lenses, the magnetic mounts will activate the magnetic switch and light the display; when the user doff's the lenses, the magnetic mounts will prompt the magnetic switch to deactivate the display—neither activity requiring the user to otherwise interface with the power source of the display.

DETAILED DESCRIPTION OF THE INVENTION

Figure 1A:
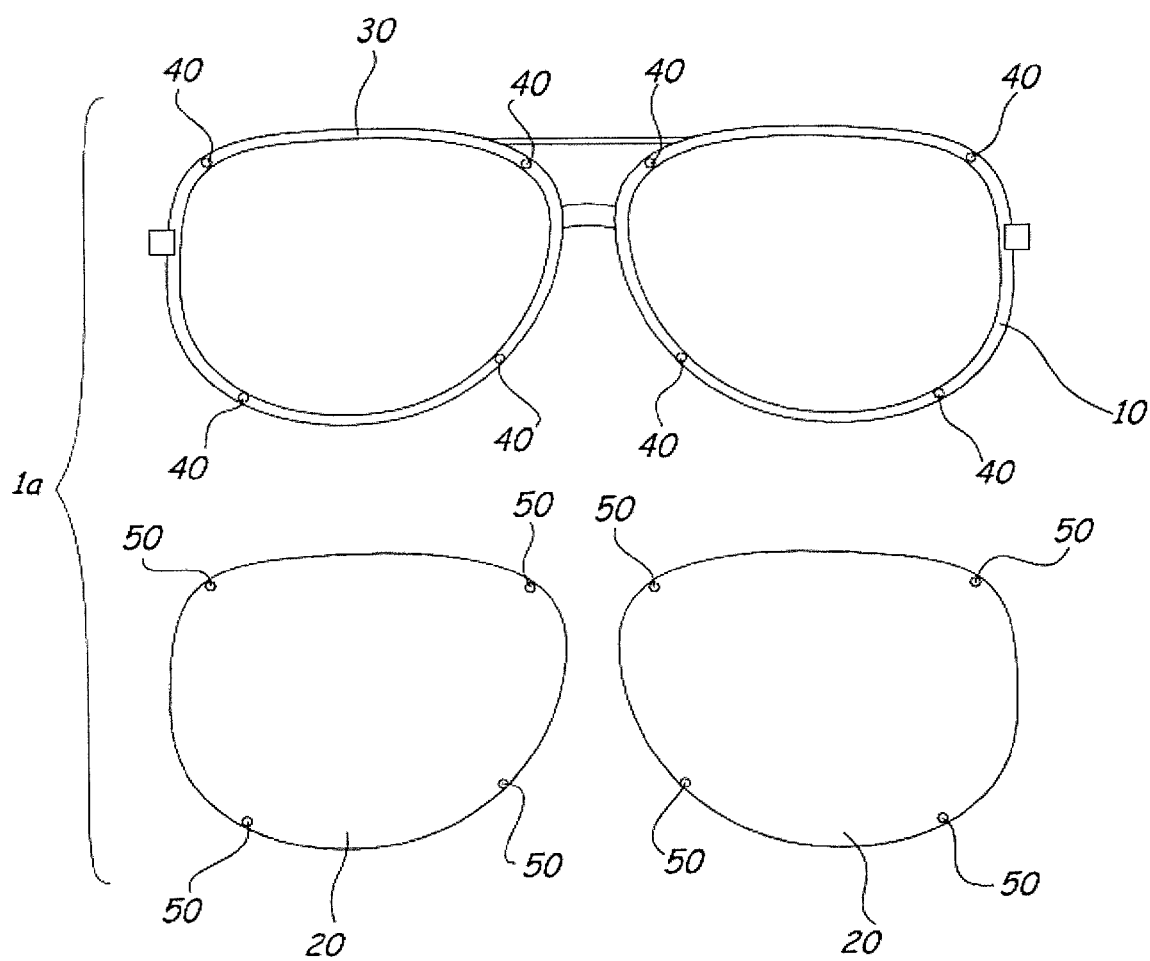
FIG. 1a is a front view of eyeglasses and lenses comprising one embodiment of the present invention

FIG. 1a shows the front view of a pair of eyeglasses 10 and a pair of auxiliary lenses 20 in a first embodiment 1a of the present invention. In order to better illustrate the present invention, many components are not shown in the figure.

The eyeglasses 10 include a frame 30 which has affixed to it a plurality of magnets 40. Said magnets are opposite in polarity from a matched plurality of opposing magnets 50 on auxilary lenses 20. When magnets 50 come within range of magnets 40, the auxilary lenses 20 become attached to frame 30.

In one embodiment of the invention, the polarities of magnets 40 and magnets 50 may be arranged so that auxiliary lenses 20 may be affixed to frame 30 in only one orientation.

Figure 1B:
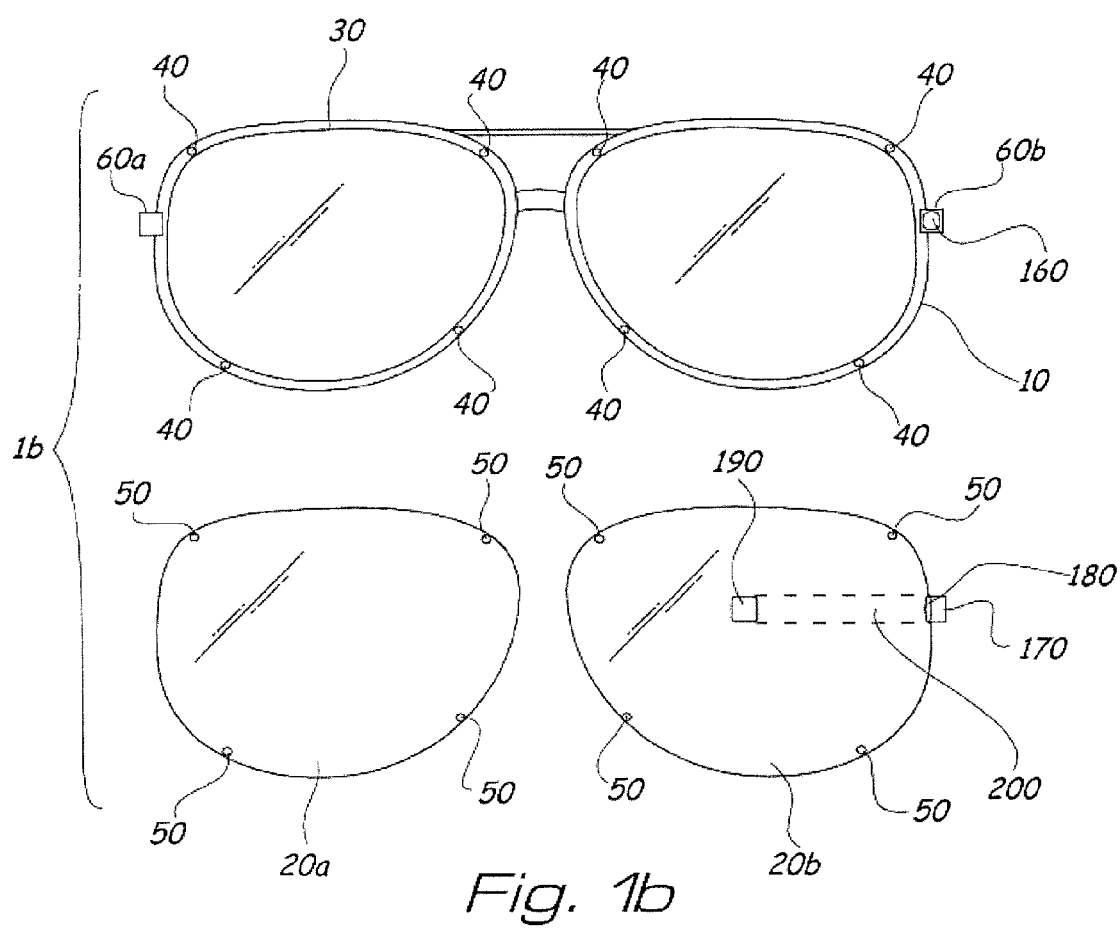
FIG. 1b is a front view of eyeglasses and lenses comprising one embodiment of the present invention

FIG. 1b shows the front view of a pair of eyeglasses 10 and a pair of auxiliary lenses 20a and 20b in a second embodiment 1b of the present invention. In order to better illustrate the present invention, many components are not enumerated in FIG. 1a and 1b.

The eyeglasses 10 include a frame 30 which has affixed to it a plurality of magnets 40. Said magnets are opposite in polarity from a matched plurality of opposing magnets 50 on auxilary lenses 20a and 20b. When magnets 50 come within range of magnets 40, the auxilary lenses 20a and 20b become attached to frame 30.

In one embodiment of the invention, the polarities of magnets 40 and magnets 50 may be arranged so that auxiliary lenses 20a and 20b may be affixed to frame 30 in only one orientation.

Attached to or embedded into a temple 60b is a display unit 160. Mounted on auxilary lens 20b is a display component 170 and a lens 180. In one embodiment of the invention, display unit 160 is a LCD panel with a backlight and display component 170 is a mirror. In this embodiment, when auxilary lens 20b is affixed to frame 30, the image projected by said display unit is reflected by said mirror through lens 180. The reflection of said image travels through said auxilary lens 20b along path 200. An optical element 190, in this embodiment a one-way mirror or the like and, if necessary, a lens, reflects said image into the eye of the user. If optical unit 190 reduces the amount of outside light entering the eye of the user, lenses 20a and 20b may be tinted to present a uniform appearance to the viewer.

In another embodiment of the invention, display unit 160 is an electrical circuit and display component 170 is a LCD panel with backlight. When auxilary lens 20b is attached to frame 30 an electrical connection is completed by the contact of display unit 160 and display component 170 and display component 170 is activated. Said display component projects an image along path 200. Said image is reflected into the eye of the user by optical element 190, in this embodiment a one-way mirror or the like and, if necessary, a lens. If optical unit 190 reduces the amount of outside light entering the eye of the user, lenses 20 may be tinted to present a uniform appearance to the viewer.

In another embodiment of the invention, optical unit 190 is a display and, if necessary, a lens. Display unit 160 is an electrical circuit and display component 170 is an electrical circuit that couples with 160. Electrical signals travel to 190 along path 200, which in this embodiment is of conductive material.

This first embodiment is not dependent on having display unit 160 affixed to or embedded in the left temple 60b of frame 30 and components 170, 180 and 190 affixed to auxilary lens 20b. Alternatively, display unit 160 may be attached to the right temple 60a and components 170, 180 and 190 may be affixed to auxilary lens 20a.

Figure 2:
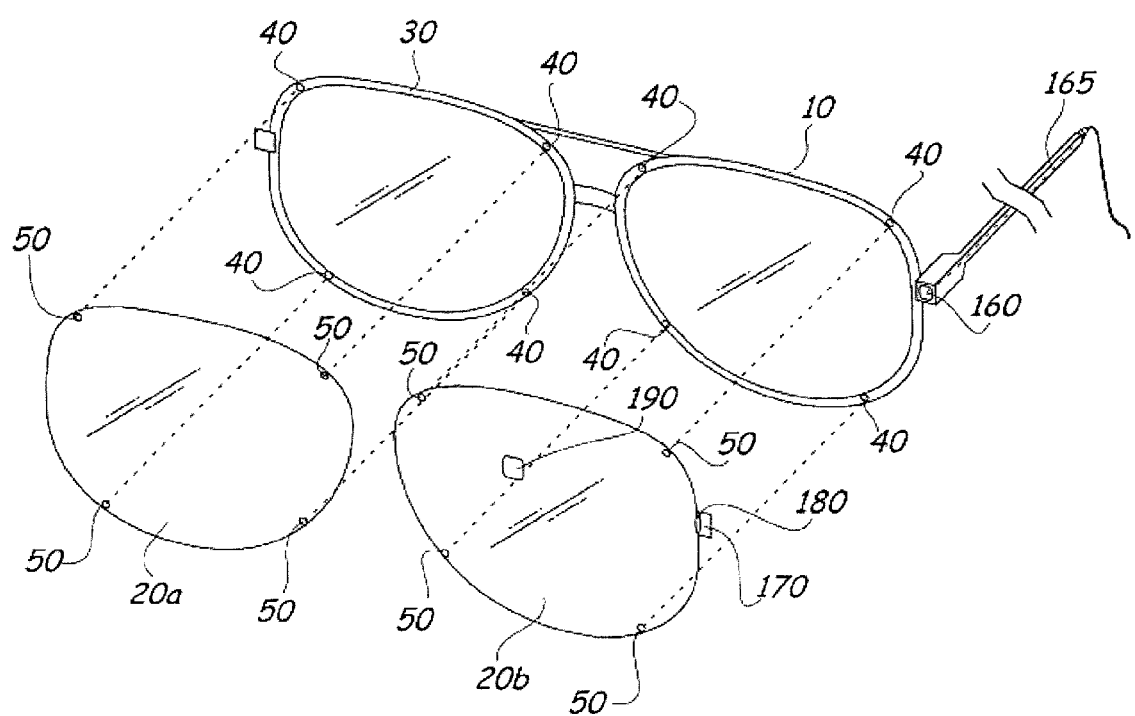
FIG. 2 is a perspective view of eyeglasses and lenses comprising one embodiment of the present invention

FIG. 2 shows a perspective view of embodiment 1b. Shown with a dotted line is a cable 165 embedded in the temple of said glasses, connecting display unit 160 to some display driving device.

Figure 3:
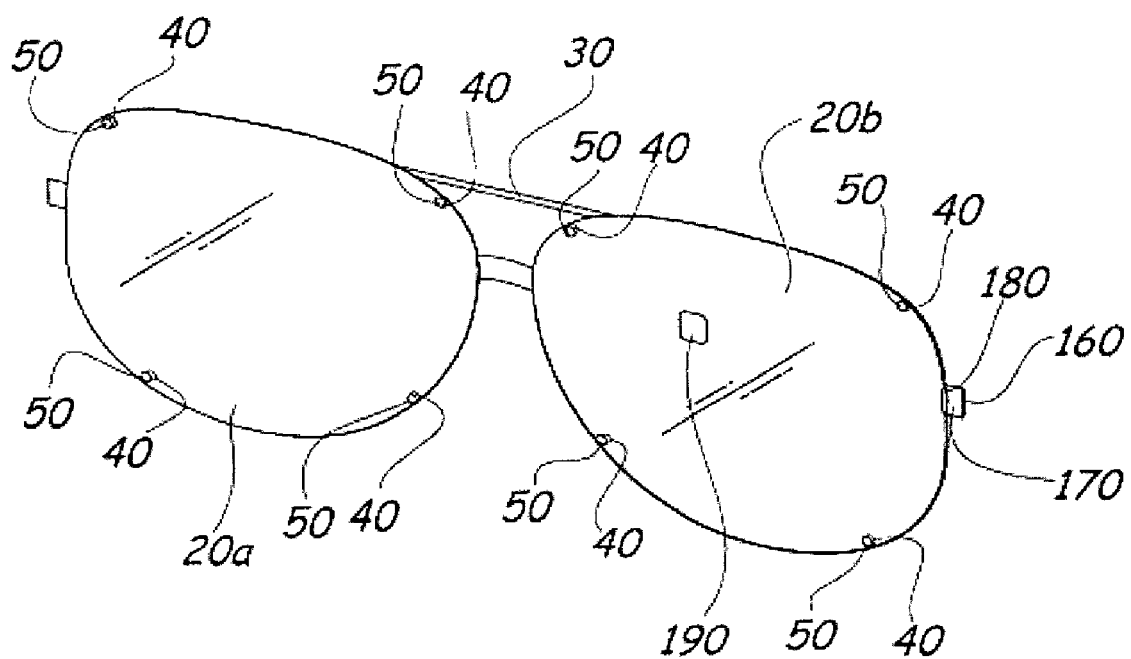
FIG. 3 is a perspective view of the lenses attached to the eyeglasses

FIG. 3 shows a perspective view of eyeglasses 1b with auxiliary lenses 20a and 20b affixed by means of magnets 40 and magnets 50.

Figure 4:
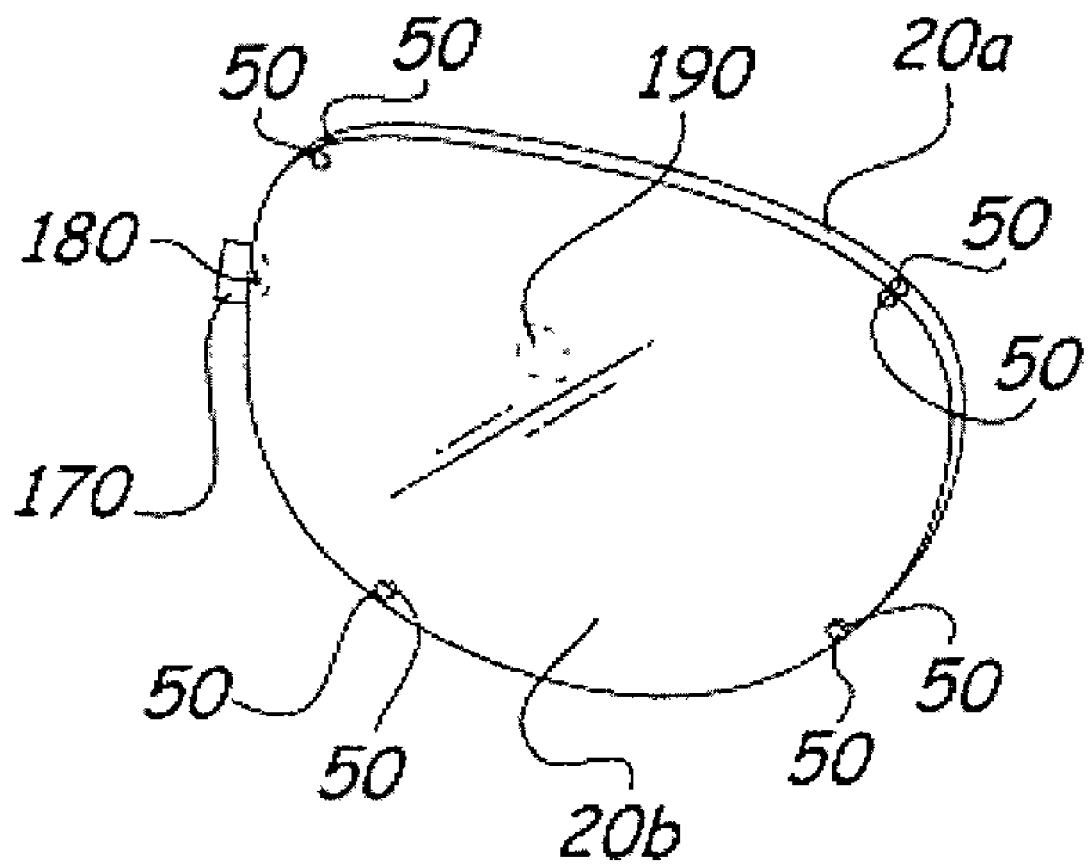
FIG. 4 is a perspective view of the lenses attached to each other

FIG. 4 shows a perspective view of auxiliary lenses 20a and 20b affixed to each other for 1 storage by means of magnets 50.

Figure 5:
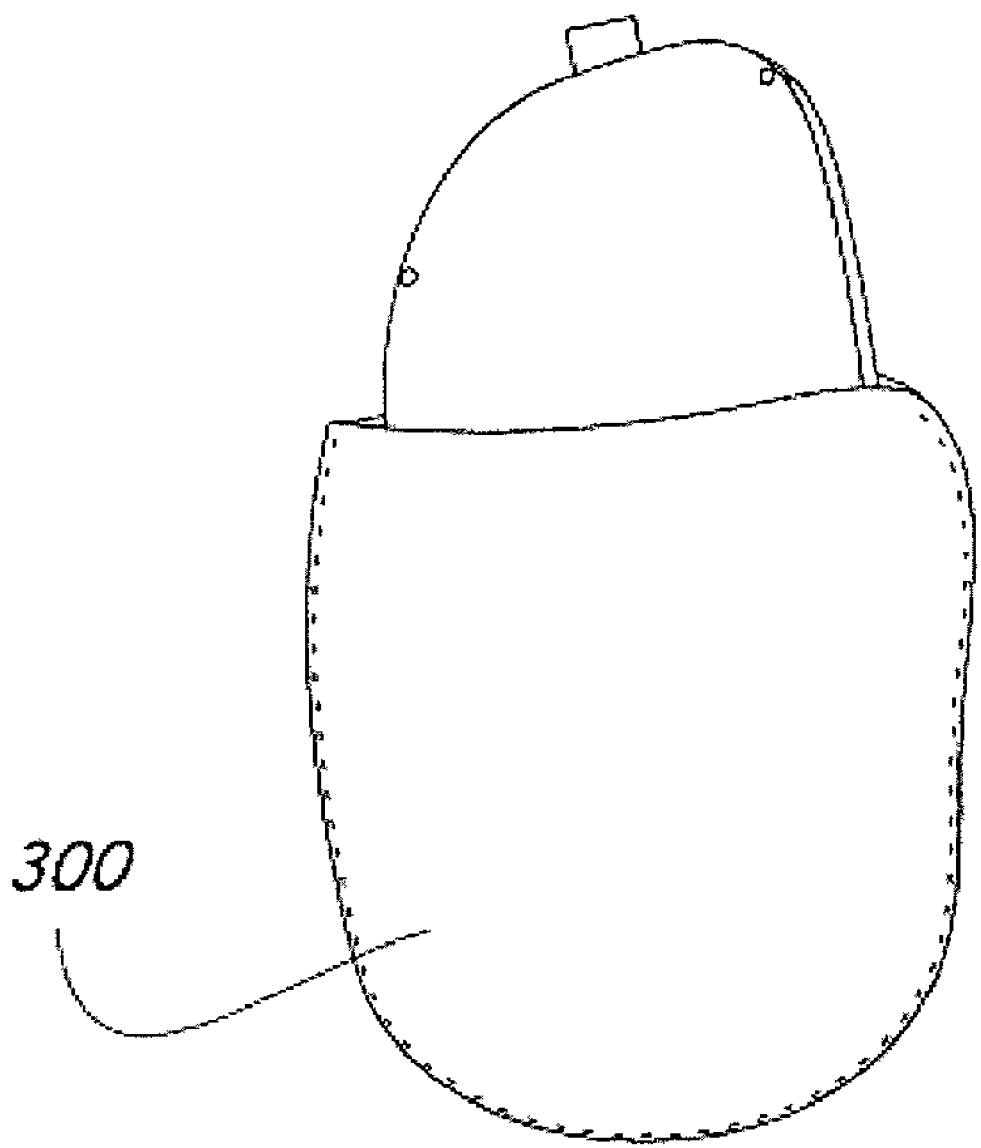
FIG. 5 is a front view of the lenses attached to each other partially inserted into a case for storage

FIG. 5 shows said auxiliary lenses affixed to each other being inserted into a storage case 300 for purposes of protection from scratches. Storage case 300 may be of rigid or pliable material.

Figure 6:
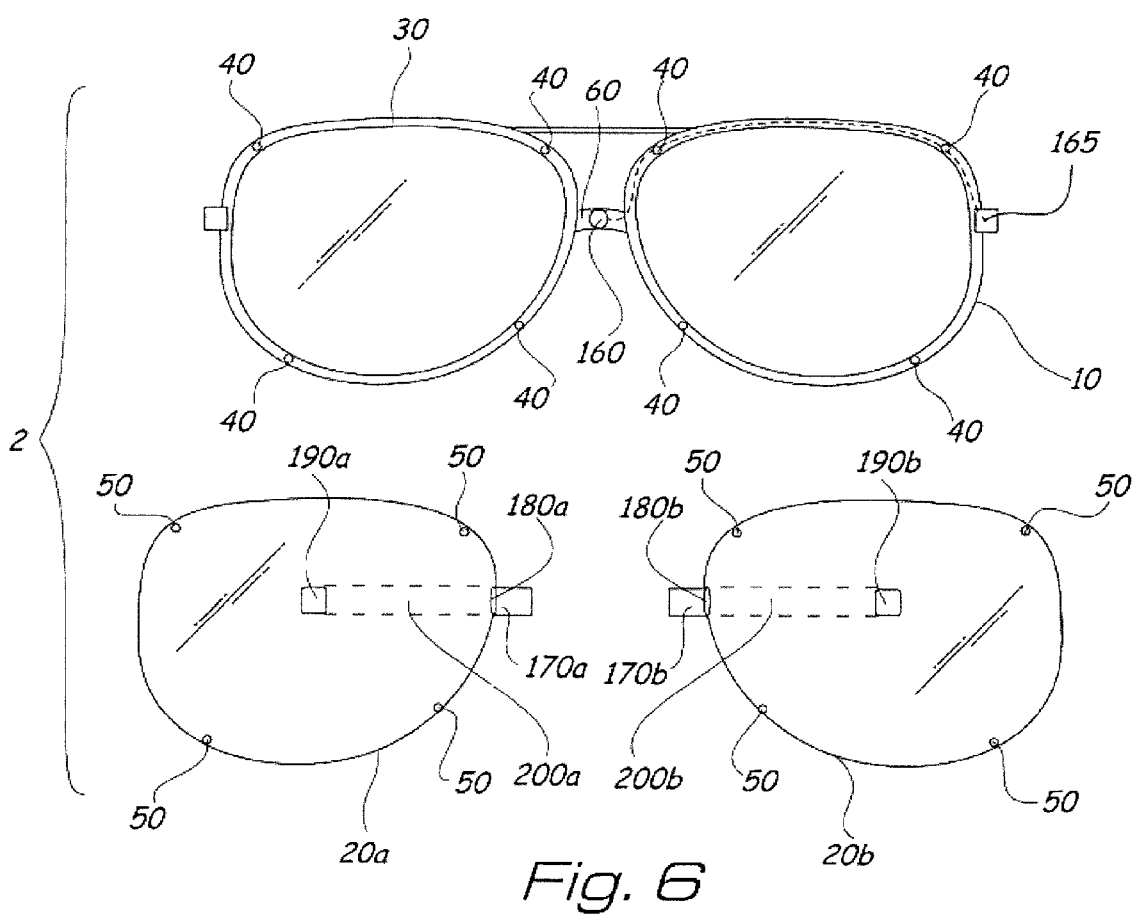
FIG. 6 is a front view of eyeglasses and lenses comprising one embodiment of the present invention

FIG. 6 shows the front view of a pair of eyeglasses 10 and a pair of auxiliary lenses 20a and 20b in a third embodiment 2 of the present invention. In order to better illustrate the present invention, many components are not shown in the figure.

The eyeglasses 10 include a frame 30 which as affixed to it a plurality of magnets 40. Said magnets are opposite in polarity from a matched plurality of opposing magnets 50 on auxilary lenses 20a and 20b. When magnets 50 come within range of magnets 40, the auxilary lenses 20a and 20b become attached to frame 30.

In one embodiment of the invention, the polarities of magnets 40 and magnets 50 may be arranged so that auxilary lenses 20a and 20b may be affixed to frame 30 in only one orientation.

Attached to a bridge 60 is a display unit 160. Shown with a dotted line is a cable 165 embedded in the frame of the glasses and exiting via the temple, as shown in FIG. 2. Said cable connects display unit 160 to some display driving device. Mounted on auxilary lens 20a is a display component 170a and a lens 180a. In one embodiment of the invention, display unit 160 is a LCD panel with a backlight and display component 170a is a mirror. In this embodiment, when auxilary lens 20a is affixed to frame 30, the image projected by said display unit is reflected by said mirror through lens 180a. The reflection of said image travels through said auxilary lens 20a along path 200a. An optical element 190a, in this embodiment a one-way mirror or the like and, if necessary, a 190 lens, reflects said image into the right eye of the user. If optical units 190a or 190b reduce the amount of outside light entering the eye of the user, lenses 20a and 20b may be tinted to present a uniform appearance to the viewer.

In another embodiment of the invention, display unit 160 is an electrical circuit and display component 170b is a LCD panel with backlight. When auxilary lens 20a is attached to frame 30 an electrical connection is completed between display component 170a and display unit 160 and display component 170 is activated. Said display component is projects an image along path 200a. Said image is reflected into the eye of the user by optical element 190a, in this embodiment a one-way mirror or the like and, if necessary, an lens.

In another embodiment of the invention, optical unit 190a and 190b are displays and, if necessary, lenses. Display unit 160 is an electrical circuit and display components 170a and 170b are electrical circuits that couple with 160. Electrical signals travel to 190a and 190b along paths 200a and 200b, respectively, which in this embodiment are of conductive material.

In this embodiment, if desired by the user, components 20a, 170a, 180a and 190a may be substituted for components 20b, 170b, 180b and 190b to project said image into the user's right eye.

Figure 7:
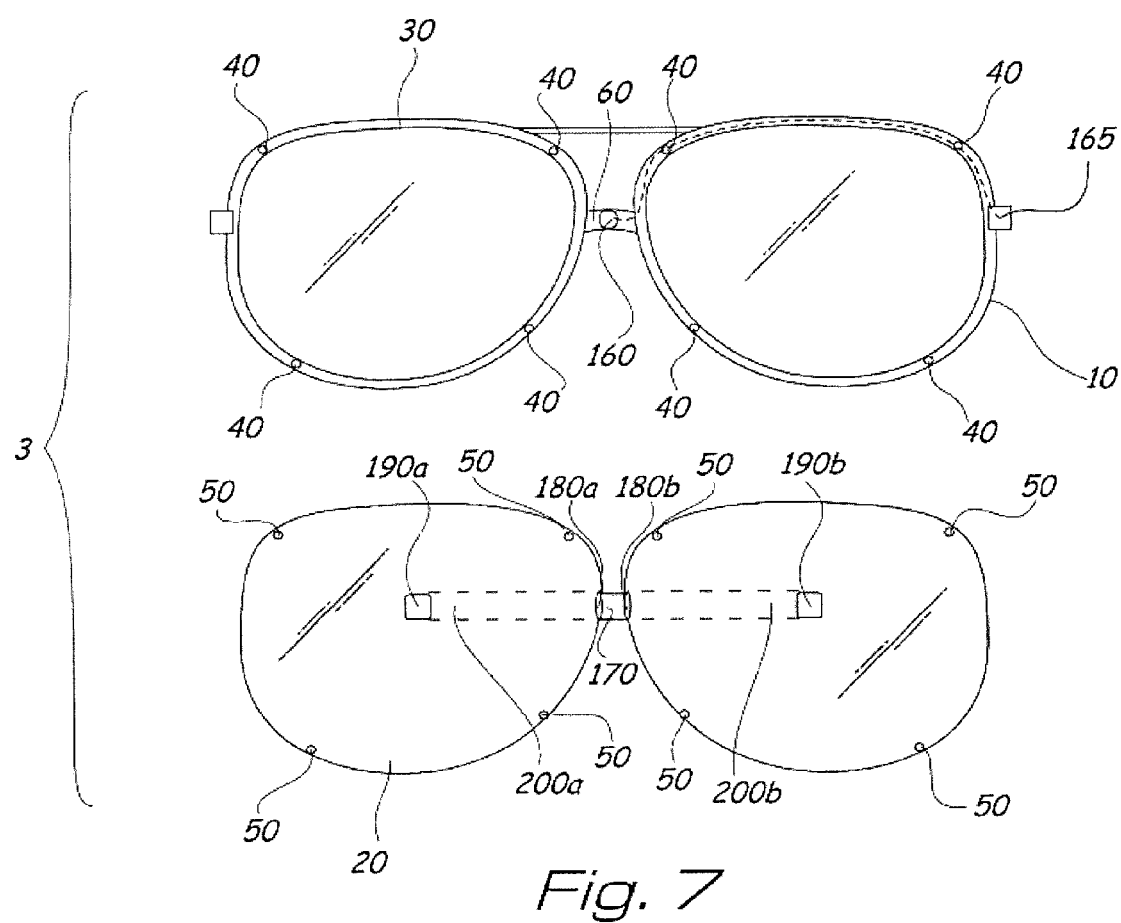
FIG. 7 is a front view of eyeglasses and lenses comprising one embodiment of the present invention

FIG. 7 shows the front view of a pair of eyeglasses 10 and a pair of auxilary lenses 20 in a fourth embodiment of the present invention. In order to better illustrate the present invention, many components are not shown in the figure.

The eyeglasses 10 include a frame 30 which as affixed to it a plurality of magnets 40. Said magnets are opposite in polarity from a matched plurality of opposing magnets 50 on auxilary lenses 20. When magnets 50 come within range of magnets 40, the auxilary lenses 20 become attached to frame 30.

Figure 8A:
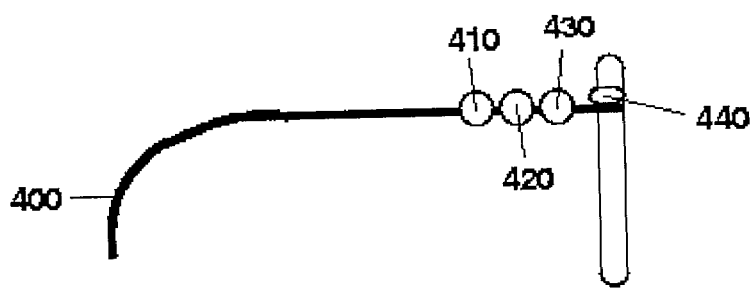
FIGS. 8a–8c is a cross section of the eyeglasses and lenses featuring magnet placement comprising one embodiment of the present invention
Figure 8B:
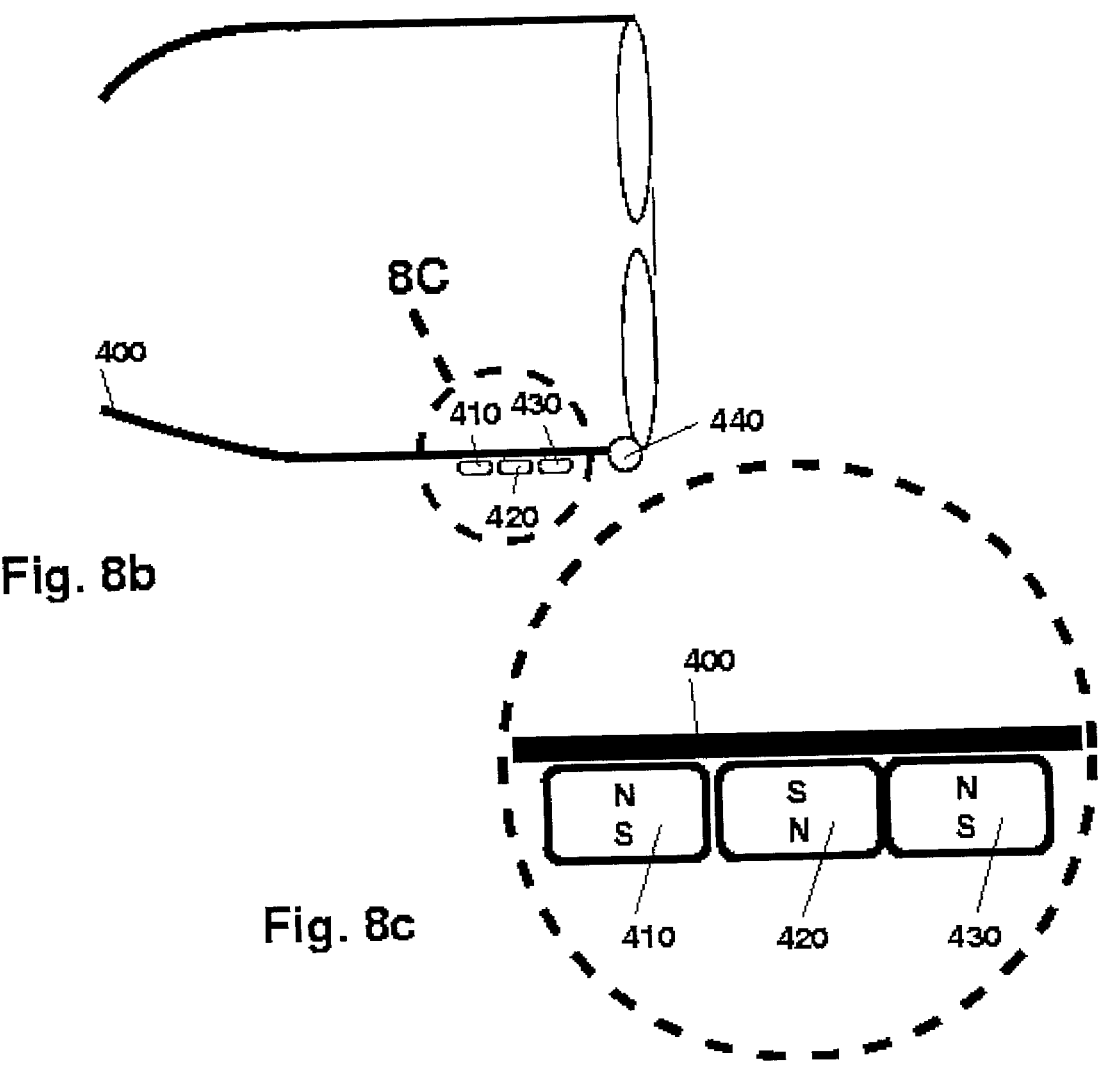
Figure 8C:
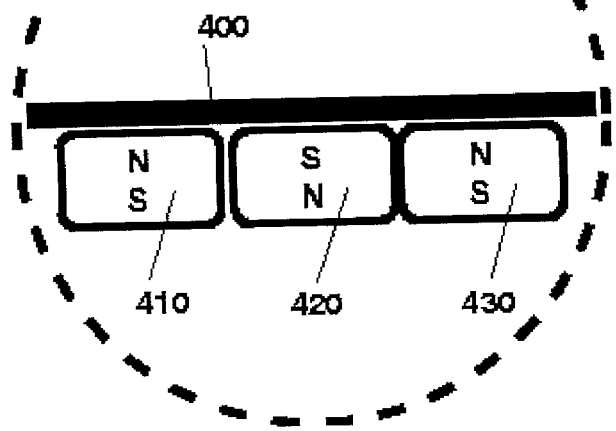

Further, our system allows head-up displays to be mounted to the user's eyeglasses magnetically. This requires a relatively small amount of modification to the user's eyeglasses—usually the attachment of several small magnets. FIGS. 8a, b and c and 9a, b and c represent a possible configuration of this embodiment of the invention. By arranging the magnets 410, 420, 430 and 440 on the temple 400 to correspond with magnets 450, 460, 470 and 480 respectively on the heads-up display 490 and aligning their poles ("N" being negative or north and "S" being positive or south, and when "N" is placed near "S" the magnets are attracted; whereas when "N1" is faced by "N2" or "S1" to "S2" the magnets repel) carefully both on the eyeglasses and the display 490, the display 490 is drawn to a preferred position and repelled from undesirable positions. Thus, the user only needs to get the display 490 in approximately the right place before it "snaps" into place. While the magnets 410, 420, 430, 440, 450, 460, 470 and 480 hold the display 490 firmly in place during physical activity, a simple tug will detach the display 490.

For example, say we have a set of 3 small round magnets of approximately 1–3 mm dia. We want to create a line of them both on the display and on the eyeglasses to create a secure mount. By placing them with their poles aligned in this manner

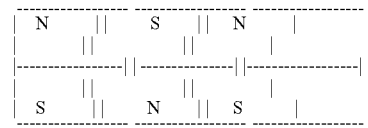

The magnets attract to each other in the line, making them easier to glue in place. More importantly, however, the magnets will repel a similar line of magnets mounted on the display if they are not aligned properly with the magnets mounted on the eyeglasses. For example,

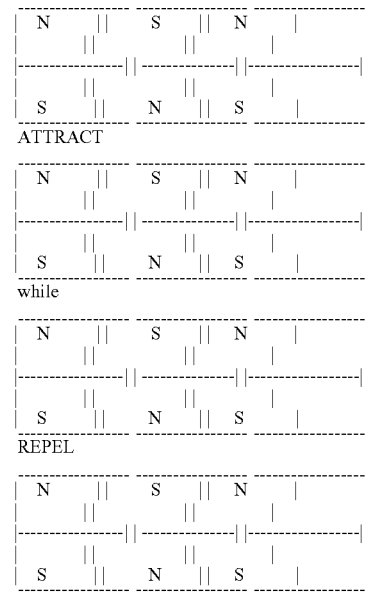

This principle can be used in multiple dimensions so that the display 490 "locks" into place on the users eyeglasses. A similar configuration allows the display to be locked into place to store the display on shoulder bag strap, vest pocket, or carrying case when the display is not being used.

Figure 9A:
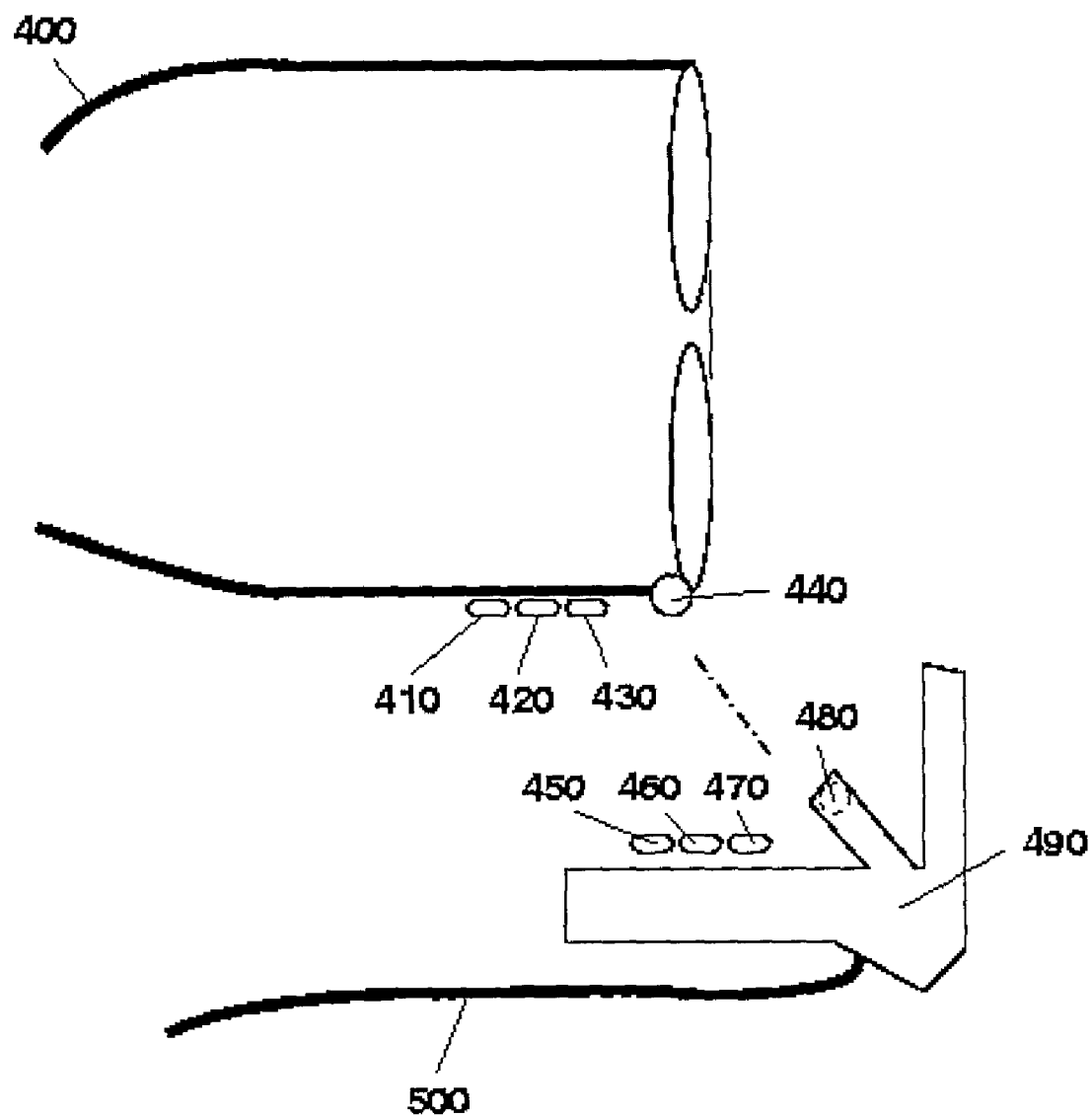
FIGS. 9a–9c is a cross section of the display orientation comprising one embodiment of the present invention with an optical, heads up display
Figure 9B:
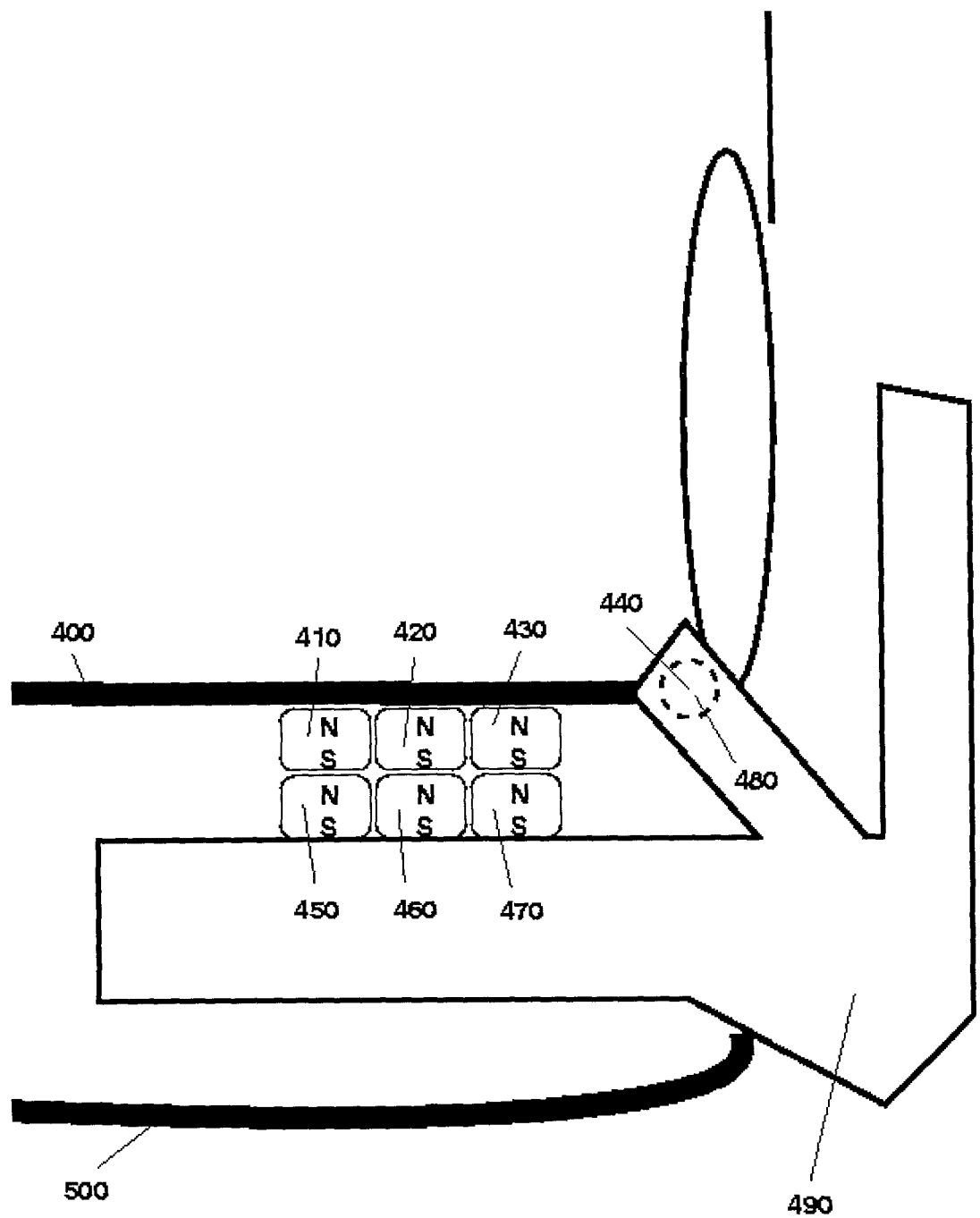
Figure 9C:
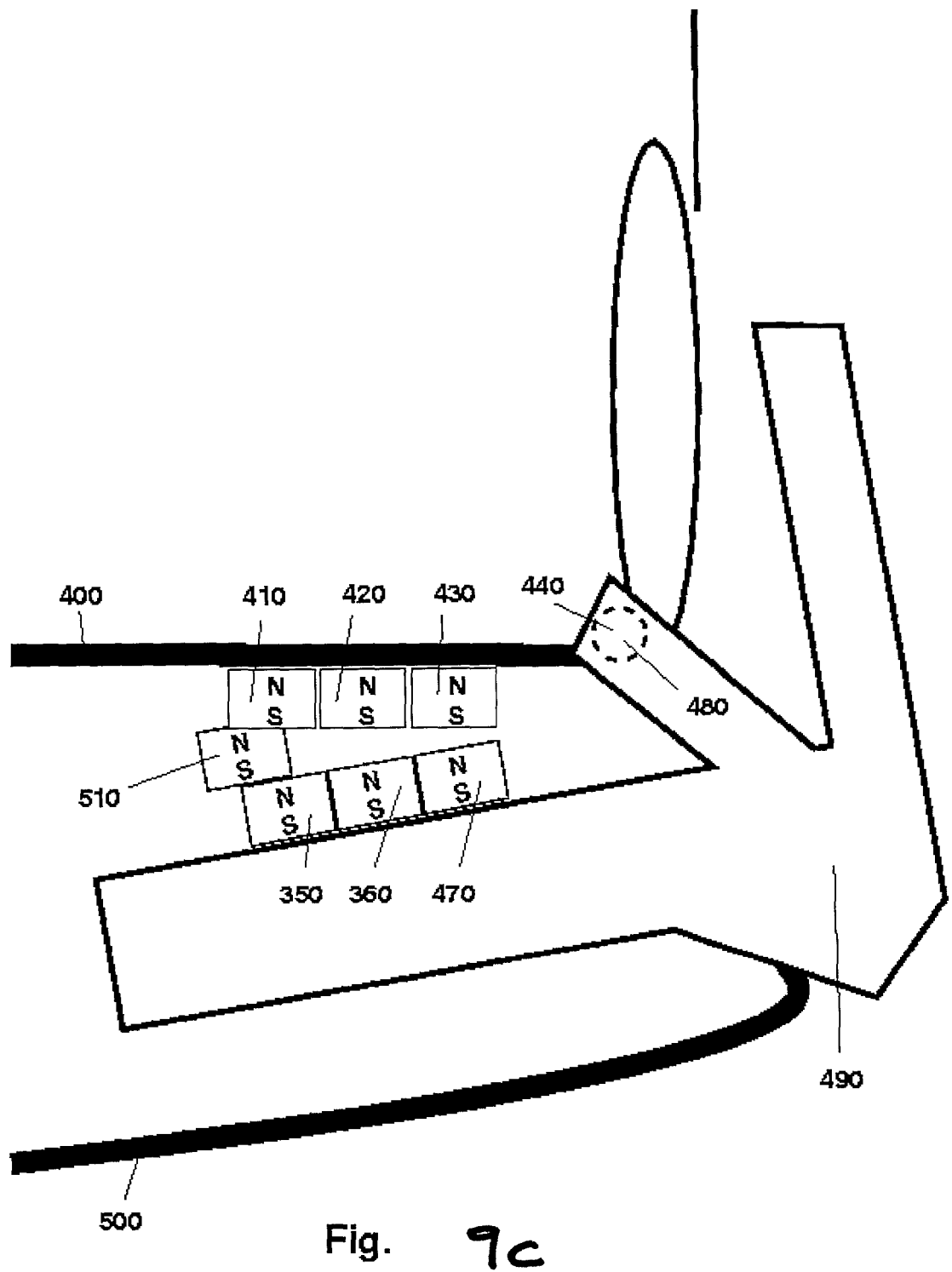

The position and orientation of a head-up display 490 in relation to the user's eye is critical in allowing the user to see all of the display. The system described above may be used to help align the display correctly. By stacking small thin magnets as represented in FIG. 9, the angle and position of the display may be adjusted until the user has a comfortable viewing position. For example, an additional magnet added to the system of 6 shown above may be used to tilt the display relative to the eyeglasses.

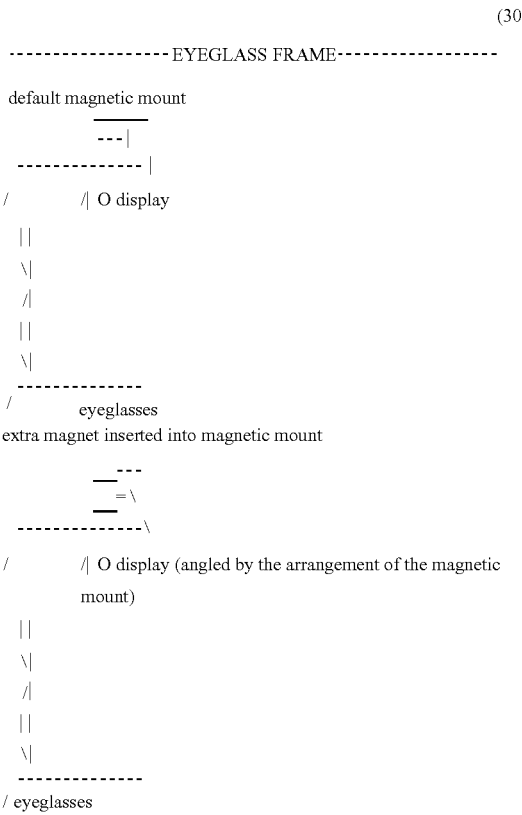

In one embodiment of the invention, the polarities of magnets 40 and magnets 50 in FIGS. 1a and b may be arranged so that auxilary lenses 20 may be affixed to frame 30 in only one orientation.

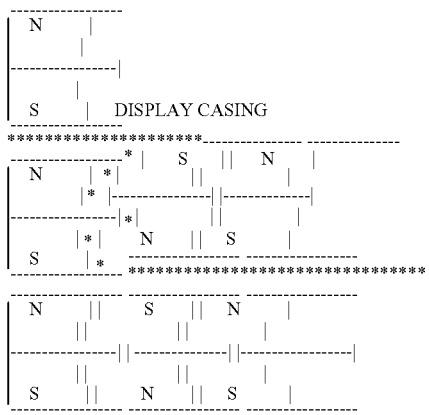

In another embodiment of the invention, a display unit 160 may be attached to a bridge 60. Shown with a dotted line is a cable 165 embedded in the frame of the glasses and exiting via the temple, as shown in FIG. 2. Mounted on auxilary lenses 20 is a display component 170, and 180a and 180b are lenses combined with LCD shutters. In one embodiment of the invention, display unit 160 is a LCD panel with a backlight and display component 170 is an image-splitting component. In this embodiment, when auxilary lenses 20 are affixed to frame 30, the image projected by said display unit is split and reflected by component 170 through lenses 180a and 180b. Said image travels through said auxilary lenses 20 along paths 200a and 200b. Optical elements 190a and 190b, in this embodiment each being a one-way mirror or the like and, if necessary, a lens, reflect said image into the eyes of the user. If optical units 190a or 190b reduce the amount of outside light entering the eye of the user, lenses 20 may be tinted to present a uniform appearance to the viewer. For a 3D-effect, the LCD shutter portions of components 180a and 180b may be triggered on alternate frames of a video stream displayed by display unit 160.

In another embodiment of the invention, optical units 190a and 190b are displays and, if necessary, lenses. Display unit 160 is an electrical circuit and display component 170 is an electrical circuit that couples with 160. Electrical signals travel to 190a and 190b along paths 200a and 200b, respectively, which in this embodiment are of conductive material. The magnets 40 and magnets 50 when paired appropriately activate the display via turning the magnetic switch imbedded in the display's cell-battery on and when separated, deactivate the display by turning the magnetic switch off.

What is claimed is:

1. A combination eyeglass and auxiliary lens attachments selectively mountable thereon, comprising:
    (a) an eyeglass frame having a pair of lenses mounted therein;
    (b) auxiliary lenses;
    (c) a first set of magnetic mounts attachable to the eyeglass frame, the first set including at least four magnet mounts for each of the lenses of the eyeglass frame;
    (d) a second complimentary set of magnetic mounts attachable to the outer edges of the auxiliary lenses corresponding to the placement of the magnets attached to the eyeglass frame, the complimentary set including the same number of magnetic mounts as the first set, with each of the magnet mounts in the complimentary set having an opposite magnetic pole as compared with the magnetic pole for the counterpart magnetic pole of the first set wherein the auxiliary lenses house an electronic optical display system.

2. A combination eyeglass and auxiliary lens attachments as defined in claim 1, wherein said both sets of magnetic mounts are permanently affixed to the eyeglass frame and outer edges of the auxiliary lenses respectively.

3. A combination eyeglass and auxiliary lens attachments as defined in claim 1, wherein the magnetic mounts are incrementally adjustable to accommodate the user's specific optical requirements.

4. A combination eyeglass and auxiliary lens attachments as defined in claim 1, wherein the magnetic mounts provide an automatic "default" setting to which the combination eyeglass and auxiliary lens attachments are drawn when placed in proximity to each other in the approximate position in which they were contemplated to attach.

5. A combination eyeglass and auxiliary lens attachments selectively mountable thereon, comprising:
    an eyeglass frame having a pair of lenses mounted therein;
    auxiliary lenses;

a first set of magnetic mounts attachable to the eyeglass frame;

a second complementary set of magnetic mounts attachable to the outer edges of the auxiliary lenses corresponding to the placement of the magnets attached to the eyeglass frame, wherein the auxiliary lenses house an electronic optical display system.

6. A combination eyeglass and auxiliary lens attachments as defined in claim 5, wherein the eyeglass frame is also wired for voice input and output.

7. A combination eyeglass and auxiliary lens attachments as defined in claim 5, wherein the magnetic mounts are incrementally adjustable to accommodate the user's specific optical requirements.

8. A combination eyeglass and auxiliary lens attachments as defined in claim 5, wherein the magnetic mounts provide an automatic "default" setting to which the combination eyeglass and auxiliary lens attachments are drawn when placed in proximity to each other in the approximate position in which they were contemplated to attach.

9. A combination eyeglass and auxiliary lens attachments as defined in claim 5, wherein said both sets of magnetic mounts are permanently affixed to the eyeglass frame and outer edges of the auxiliary lenses respectively.

10. A combination eyeglass and auxiliary lens attachments as defined in claim 5, wherein the eyeglass frame is also wired for Internet connectivity.

11. A combination eyeglass and auxiliary lens attachments as defined in claim 5, wherein the eyeglass frame is also wired for an electrical circuit connected to an LCD panel with a backlight and display component or a mirror capable of at least one of reflecting and splitting images generated on the LCD panel and directing them into the eye of the user.

12. A combination eyeglass and auxiliary lens attachments as defined in claim 5, wherein at least one of the magnet mounts is capable of activating and deactivating a battery cell that serves to power the display system via a magnetic on/off switch.

* * * * *